Figure 1:
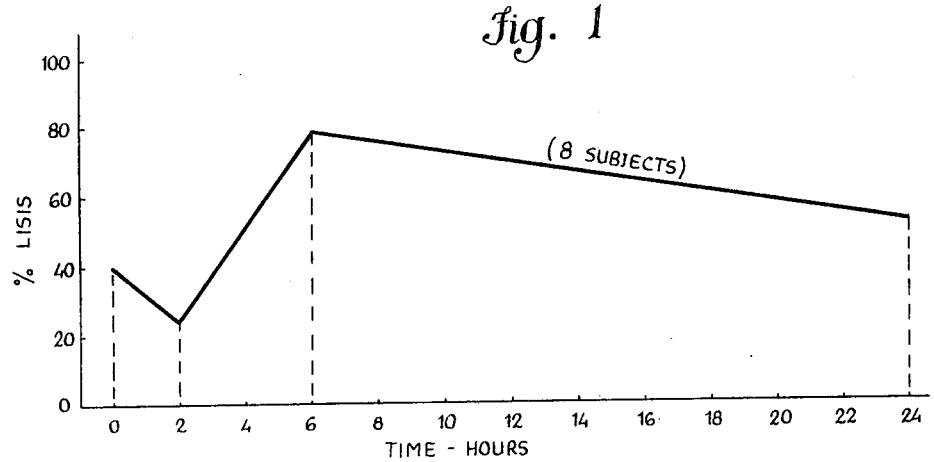

United States Patent [19]
Giotti et al.

[11] 3,725,553
[45] Apr. 3, 1973

[54] METHOD FOR ACTIVATING THE BLOOD FIBRINOLYSIS BY ADMINISTRATION OF 2-AMINO-ETHANESULPHONIC ACID OR SALTS THEREOF

[76] Inventors: Alberto Giotti, No. 15 via Trento; Federigo Sicuteri, No. 17a via J. Nardi, both of Firenze, Italy

[22] Filed: Apr. 15, 1970

[21] Appl. No.: 28,588

[30]     Foreign Application Priority Data

Feb. 23, 1970    Italy.................................48769 A/70

[52] U.S. Cl..................................424/315, 424/248
[51] Int. Cl. ...............................................A61k 27/00
[58] Field of Search............................424/3, 1 S, 303

[56]           References Cited
            OTHER PUBLICATIONS

Chemical Abstracts, Vol. 30 (1936) p. 8399
Chemical Abstracts, Vol. 47 (1953) p. 6098 h.
Jacobsen et al., "Phys. Reviews," Vol. 48 No. 2 (1968) pp. 464-65, 485-86, 491.

*Primary Examiner*—Albert T. Meyers
*Assistant Examiner*—Vincent D. Turner
*Attorney*—Wenderoth, Lind and Ponack

[57]           ABSTRACT

A method for activating the fibrinolysis of blood by administration of a pharmaceutical compound consisting of 2-amino-ethane-sulphonic acid or a salt thereof and a pharmaceutical carrier therefor. The salts of taurine with inorganic and organic bases releasing Na+, K+, Ca++, Mg++ ions as well with diethylamine, morpholine and like are suited thereto.

3 Claims, 2 Drawing Figures

METHOD FOR ACTIVATING THE BLOOD FIBRINOLYSIS BY ADMINISTRATION OF 2-AMINO-ETHANESULPHONIC ACID OR SALTS THEREOF

The present invention relates to a method for activating the fibrinolysis of the blood by administration of the 2-amino-ethanesulphonic acid (Taurine) or salts thereof.

More particularly, this invention relates to the administration of taurine by oral or venous way in the dosages and with the modes later on described, in order to stimulate the fibrinolythic-thrombolythic activity of the blood, particularly in the angiopathic subjects.

It is known that the heart and limbs diseases, particularly angina pectoris and claudicatio intermittens, can be suitably treated by preparations having a specific vasodilating action (the so called vasodilators and particularly the coronary dilating agents) or by preparations having no specific action of this kind on the vases. In both cases the action mechanism has not been rendered clear; for the vasoactive drugs the discussion is about the possibility that a vasodilating action will improve the blood supply to the tissues, while for the non vasodilating drugs it is admitted that the action will be carried out at the tissue level, modifying in certain modes the metabolism and the request of oxygen, as it has been observed by F. Sicuteri and A Giotti in "Perspectives in the field of antianginal non coronary dilating agents" in "Circulatory drugs" North Holland Publ.Co. Amsterdam 1969.

Also the pyrotherapy proves to be particularly useful in the ischemic diseases of the arts and viscerae; the mechanism has been referred first to vasodilating which accompanies the hyperpyrexy. On the other hand it has been observed that also in non febrific dosages clinic replies are obtained, as well as leukocytic and enzymatic movements, and particularly an increase of the fibrinolysis and of the betaglucoronidase, an enzyme having a predominantly lysosomial origin (see A. Bevazzano, M. Fanciullacci, F. Sicuteri "Effect of the endotoxins in sub-febrific dosages on some plasmatic, enzymatic levels (betaglucoronidase, acid phosphotase) and on the diuresis of the man" in Boll. Soc. Ital. Sper. 43, 1403, 1967).

A non dilatating drug having a beneficial action in the angina pectoris (F. Sicuteri, G. Franchi, A. Giotti, A. Guidotti in "On the antianginal action of a non coronary dilating sulphurated aminoacid" in Clinica Terap. 49, 205, 1969 and in "Taurina as a therapeutic agent in vascular pain (angina pectoris and claudicatio intermittens)" in Clinical Medicine which is now being printed), in myocardial infarction (F. De Rango, P. Del Corso "Electrocardiographic modifications induced by the taurine in the coronary cardiodiseases" in Rec. Progr. Med. 44, 19, 1968), as well as in the claudicatio intermittens (U. Becattini "Perspectives of a novel drug in the therapy of the vasculopathies: the taurine" in Sett. Med. 55, 1355, 1967) is a sulphonated aminoacid and particularly the 2-amino-ethanesulphonic acid (taurine), the biologic features and pharmaceutical properties of which have been discussed by J. G. Jacobsen and L. H. Smith in "Biochemistry and physiology of Taurina and Taurina derivatives" (Physiol. Rev. 48, 424, 1968) and A.Guidotti and A. Giotti in "Taurine and cardiovascular system" (Rec. Progr. in Medicina, in publication).

While the action mechanism of this preparation is not clear, the possibility has been admitted of a greater utilization of oxygen at tissular level (U. Becattini, G. Cangi, G. Gabrielli, S. Citi, L. Loddi "La determination continue de la saturation en oxygen et du contenu en $CO_2$ dans le sang in vivo" in Bull. Phys. Resp. 2, 289, 1966) or with an indirectly competitive mechanism on the metabolic actions of adrenalin.

As the fibrinolytic drugs (pyrogens, oral antidiabetics, nicotinic acid) have a certain efficiency on the ischemic diseases, and as information in this connection is not found in the literature, applicants have, according to this invention, tested the possible actions of the taurine on the fibrinolytic homeostasis and it has been surprisingly found that this preparation develops an intense fibrinsolytic action.

Also the saline derivatives of the taurine develop a strong fibrinolytic action. The salts of taurine with inorganic and organic bases releasing $Na+$, $K+$, $Ca++$, and $Mg++$ ions as well as with diethylamine, morpholine and the like have been determined suited thereto.

Particularly, it has been experimentally ascertained that while the 2-amino-sulphonic acid (taurine) is not active at the hematic level, where indeed, at high concentrations in vitro or soon after a venous administration, it inhibits the fibrinolysis, the same causes a certain latency after the initial period of high plasmatic concentration, at the moment when its passage in the tissues occurs, and a durable and relevant increase of the fibrinolytic activity occurs. This feature of the taurine and particularly of the activation of the fibrinolysis practically obtainable permits its use for fibrinolytic-thrombo-lytic purposes.

It must also be noted that the taurine is a sulphurated aminoacid biologically present in the human organism and is very well tolerated if administered either by oral or by venous way.

Accordingly, a specific object of the present invention is a method for activating the fibrinolysis of the blood by administration of the 2-amino-ethanesulphonic acid (taurine) or salts thereof by oral or venous way. Now particular reference is made to taurine.

In case the taurine administration will be carried out by phleboclysis, the preferred dosage is 2 grms. of taurine, administered in subsequent fractions of 10 mg/min.

On the contrary, when the administration is carried out by oral way, the preferred dosage is 2 grms. each 8 hours, through a total of 24 hours.

The present invention will now be described more in detail with reference to the clinic experiments carried out and whose adopted techniques and substances used are hereinafter reported. The tests have been carried out on a total of 18 subjects of the Medical Clinic of the University of Florence, including both angiopathic subjects and patients free from present cardiocirculatory diseases.

The 18 subjects were subdivided into three groups formed as follows:
Group A : 8 subjects
Group B : 5 subjects
Group C : 5 subjects.

ADMINISTRATION OF TAURINE BY VENOUS WAY

In the morning from the subjects (8) of Group A, fast from 12 hours and in horizontal position since at least 2 hours, have been drawn, avoiding any stasis, two amounts of 4 cc. each of citrated venous blood, from a surface vein of the elbow. To these subjects has been then administered taurine (the taurine for venous use has been largely put at disposal by the Istituto Farmochimico Falorni - Florence) by phleboclysis at the dosage of 100 mg/min. up to a total of 2 grms. Then other amounts of 4 cc each of citrated blood have been drawn at the end of the phleboclysis, after 2 hours, 6 hours, 24 hours. On the specimens of obtained blood the fibrinolytic activity has been determined on the whole blood, which has been diluted and instantaneously coagulated with thrombin (see G.R. Fearuley, "Fibrinolysis" in Edward Arnold Pub. London 1965), using the modification of the metering of the hemoglobin of the red corpuscles rendered free from the coagulum in a fixed incubation time (see, for instance, L. Andreotti and G. Nuzzani "Evaluation of the fibrinolytic activity in the human blood" in Riv. Crit. Clin. Medica 64, 1967, 1964) improved by the metering of the coagulum of whole diluted and citrated blood in a fixed incubation time of 2 hours (see for instance Astrupt Abet "Activator of bovin plasminogen, by the plasminogen activator in animal tissue" in Thrombos. Diathes Haemorrh. 4, 201, 1960 and A.G. Dottori and O. Ponari "The fibrinolysis " in Ed. Min. Med. Torino 1964). As if the rate of fibrinogen in the blood is very scarce, the blood can be practically non coagulable and therefore it is possible to have a wrong evaluation of the lysis, in the examined subjects the fibrinogenhemia has been always dosed, and said fibrinogenhemia appeared always to have such a value as to ensure a normal coagulation, i.e., greater than 340 mgr/100 cc. of plasma.

ADMINISTRATION OF TAURINE BY ORAL WAY

The administration has been carried out on the subjects (5) of the Group B. In these subjects, fast since 12 hours and in horizontal position since at least 2 hours, has been determined in the morning the fibrinolytic activity of the whole blood with the above cited method. Subsequently, taurine has been administered by oral way in the dosage of 2 grms every 8 hours. After 24 hours in the same circumstances wherein the spontaneous fibrinolytic activity has been determined, the fibrinolytic activity has been metered again on the whole blood.

TESTS IN VITRO

In the subjects of the Group C (5) the spontaneous fibrinolytic activity is determined. Simultaneously on an analogous blood sample the action of the taurine in vitro is tested at the dosage of 12.5 mgr/cc of diluted whole blood.

The results of the test carried out on the subjects of the Groups A and B have been summarized as follows with particular reference to the drawings (FIGS. 1 and 2) herewith attached, where diagrams have been reported supplying (on the vertical axis) the percent of fibrinolysis obtained versus the time (axis of the abscissae) metered starting from the termination of the taurine administration.

Figure 2:
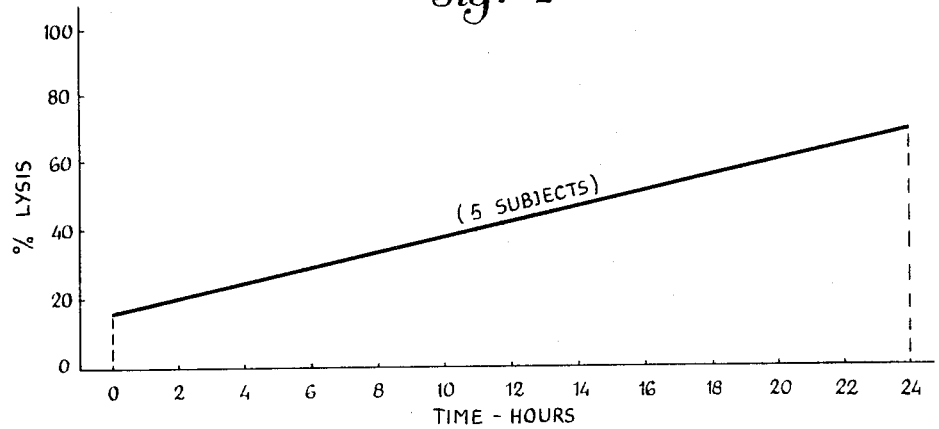

The dosages are those already specified for the Groups A and B to which the FIGS. 1 and 2 relate, respectively.

With particular reference to Group A (8 subjects) soon after phleboclysis, the fibrinolytic activity of the entire blood diminishes, continuing its decrease until the second hour from the substance administration; at the sixth hour it increases from the base average value 40.8 percent to an average value 79.3 percent to come back, after 24 hours to the basic value (see FIG. 1).

In the subjects (5) to whom taurine has been administered by oral way (Group B) after 24 hours an increase of the fibrinolytic activity has been found in the blood passing from an average value 16 percent to an average value 67.4 percent (see FIG. 2).

In cases where the fibrinolytic activity of the taurine in vitro has been tested (Group C, 5 subjects), not only is there an absence of any activation, but also at the dosages used, a block of the fibrinolytic activity of the whole blood passes from an average basic value of 40 percent to an average value of 11.6 percent.

From the above related results it is possible to conclude that the taurine acts on the fibrinolysis in two opposite directions: when infused by venous way so that high concentrations of the sulphurated aminoacid are reached in the blood, there is in the first hours, subsequent to infusion, an inhibition of the fibrinolytic activity; this datum is in conformity with the inhibition of the plasminogen-plasmin system which is obtained by incubating taurine with whole blood in vitro.

After the initial period of high plasmatic concentration, at the moment when the taurine tends to pass into the tissues, a relevant and extended increase of the fibrinolytic activity will be noted. This behavior of the fibrinolysis suggests the hypothesis that the taurine will act on the fibrinolysis not at a plasmatic level, but a tissular level, rendering free kinase or promoting the action of the tissular activator. If the possibility of an action is admitted on the plasminogen-plasmin starting from the tissues, the hypothesis of a mobilization of the tissular activator is the most reliable since as aforesaid the fibrinolytic activity of the sulphurated amine is slow to start and lasts through a rather long time. The action of the plasminogen-plasmin system of the tissular activators released by taurine is definitely slower than that of the plasmatic activators stimulated by streptokinase and urokinase, being that the action of the plasmatic activators is grounded on a stoichiometric ratio reaction. Also in favor of a possibility of action of the sulphurated amine at the tissular level, it can be considered a fact that the taurine has a high proper tropism for those tissues (see J. Awapara "Aminoacids pools" in J.T. Holden Edition, Elsevier Publ. Amsterdam 1962, pag. 158) which have the highest activator contents (see O.K. Albrechtsen "Fibrinolytic activity of human tissues" in Brit. Haemat. 3, 284, 1957).

Apart from this hypothesis which relates to the pharmacologic mechanism, the practical aspect remains of the importance of the fibrinolytic power of the amine. In other words by this sulphurated amino-acid a substance is supplied, biologically present in the organism, excellently tolerated, and capable, if administered by oral way, of activating the fibrinolysis with such an activity as to be utilized for therapeutical purposes.

Having thus described the present invention, what is claimed is:

1. A method for inducing fibrinolysis of blood in a patient requiring such inducement comprising orally or intravenously administering to said patient an effective fibrinolysis-inducing amount of a composition containing 2-amino-ethanesulphonic acid or the sodium, potassium, calcium or magnesium salt thereof as active ingredient, and a pharmaceutically acceptable carrier therefor.

2. The method according to claim 1, wherein the composition is administered intravenously in subsequent dosages of 100 mg/min. of active ingredient until a total dosage of 2 grams of active ingredient has been administered.

3. The method according to claim 1, wherein the composition is administered orally in subsequent dosages of 2 grams of active ingredient each 8 hours for a total of 24 hours.

* * * * *